(12) United States Patent
Hwang

(10) Patent No.: US 6,446,898 B1
(45) Date of Patent: Sep. 10, 2002

(54) WIRE COLLECTOR

(76) Inventor: Lih-Jiuan Hwang, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/514,593

(22) Filed: Feb. 28, 2000

(51) Int. Cl.$^7$ ............................................... B65H 75/48
(52) U.S. Cl. ................................. 242/378.1; 242/388.1
(58) Field of Search ........................... 242/378.1, 378.2, 242/378.3, 373, 388.1; 191/12.2 R, 12.4

(56) References Cited

U.S. PATENT DOCUMENTS

| | | | | |
|---|---|---|---|---|
| 585,778 A | * | 7/1897 | McLeod | 242/378.3 |
| 2,514,628 A | * | 7/1950 | Cortes | 191/12.4 |
| 2,926,865 A | * | 3/1960 | Humphreys | 242/378.3 |
| 3,208,121 A | * | 9/1965 | Price | 242/388.1 |
| 3,834,645 A | * | 9/1974 | Morishige | 242/385.3 |
| 4,165,053 A | * | 8/1979 | Konig | 242/378.3 |
| 4,417,703 A | * | 11/1983 | Weinhold | 242/378.3 |
| 4,653,833 A | * | 3/1987 | Czubernat et al. | 439/528 |
| 4,901,938 A | * | 2/1990 | Cantley et al. | 242/378.1 |
| 5,104,056 A | * | 4/1992 | Jannotta et al. | 242/373 |
| 5,114,091 A | * | 5/1992 | Peterson et al. | 242/378.3 |
| 5,544,836 A | * | 8/1996 | Pera | 242/372 |
| 5,588,626 A | * | 12/1996 | Yang | 242/378.1 |
| 6,019,198 A | * | 2/2000 | Nielsen | 188/31 |
| 6,019,304 A | * | 2/2000 | Skowronski et al. | 242/373 |
| 6,056,591 A | * | 5/2000 | Liao | 439/501 |
| 6,079,657 A | * | 6/2000 | Hwang | 242/388.1 |
| 6,199,784 B1 | * | 3/2001 | Wang et al. | 242/378 |
| 6,250,578 B1 | * | 6/2001 | Manda | 242/378.1 |
| 6,254,025 B1 | * | 7/2001 | Liao | 242/378.1 |

* cited by examiner

Primary Examiner—Donald P. Walsh
Assistant Examiner—Daniel K Schlak
(74) Attorney, Agent, or Firm—Troxell Law Office PLLC

(57) ABSTRACT

A wire collector, designed for auto reeling of communication wire, having a shell body with a wire reel, an elastic element, and other component members in the interiors. The wire reel enables the lower end of the wire to pass through the front end of the shell body, while the upper end of the wire will pass through the rear end of the shell body. The reel is connected to an elastic element. In use, communication wire will no longer tangle in a disorderly manner when the wire collector is being rolled, and users will be able to pull out the front end of the communication wire or enable it to be reeled in automatically by the elastic element to make the entire operation easy and convenient.

1 Claim, 6 Drawing Sheets

WIRE COLLECTOR

BACKGROUND OF THE INVENTION

1) Field of the Invention

A wire collector particularly designed for the reeling and arranging of communication wire, which will not be tangled when being reeled and collected by the wire collector. A lower end of the wire can be pulled out or collected automatically, to the effect of making its reeling and arranging motion easier and more convenient.

2) Description of the Prior Art

Due to the rapid development of the current information industry, the internet has become a most essential source of information. A data modem is used by a computer for connecting the computer with a network through a communication wire of a fixed length that connects with a telephone wirebox. Any excessive length of the communication wire is usually collected and tied in a bundle together with the other computer wires to prevent it from being tangled with the other wires of the computer, and appearing disordered. However, the wire has to be unbundled in case of repair and maintenance. All the wire which is collected in bundle has to be untied separately for repair and maintenance, and has to be arranged in order once again when repair and maintenance are completed.

In addition, a data modem may be built into a laptop computer to enable users to go on-line with the network. The data wire utilized by a data modem built into a laptop computer has to be carried separately by the users to enable connection with any network at any time. However, to facilitate the easy carrying of a data wire of a moderate length, it has first to be rolled and tied and fixed into a bundle, and at the time of using, the data gang wire has to be unrolled and untied for extension. This causes trouble and is inconvenient to the users. Moreover, when the data wire is being rolled up for carrying, it will tangle with other articles, or will be damaged and broken.

SUMMARY OF THE INVENTION

The main objective of the present invention is to provide a wire collector, having a wire reel, an elastic element, and other component members built within a shell body. The aforementioned wire reel is formed by an upper reel body and a lower reel body connected together to enable the lower end of the communication wire to wind onto the annular wall on the wedged space formed between the upper and the lower reel bodies, while the upper end wire is wound on a jack post on the upper reel body. In so doing, the communication wire will be kept in proper order by means of rolling up the wire collector, and thus will enable easy and convenient operation.

The secondary objective of the present invention is to provide a wire collector, with a torsion spring, of which one end is fastened onto the lower reel body, while another end rolls freely on a fixed reel. Pulling the lower end of the communication wire enables the wire reel to rotate, and also enables the torsion spring to wind around the bottom end of the wire reel to produce a fixed shrinkage and rolling force, so as to further enable the lower end of the communication wire to be pulled out easily for utilization.

DETAILED DESCRIPTION OF THE PREFERRED EMBODIMENT

Figure 1:
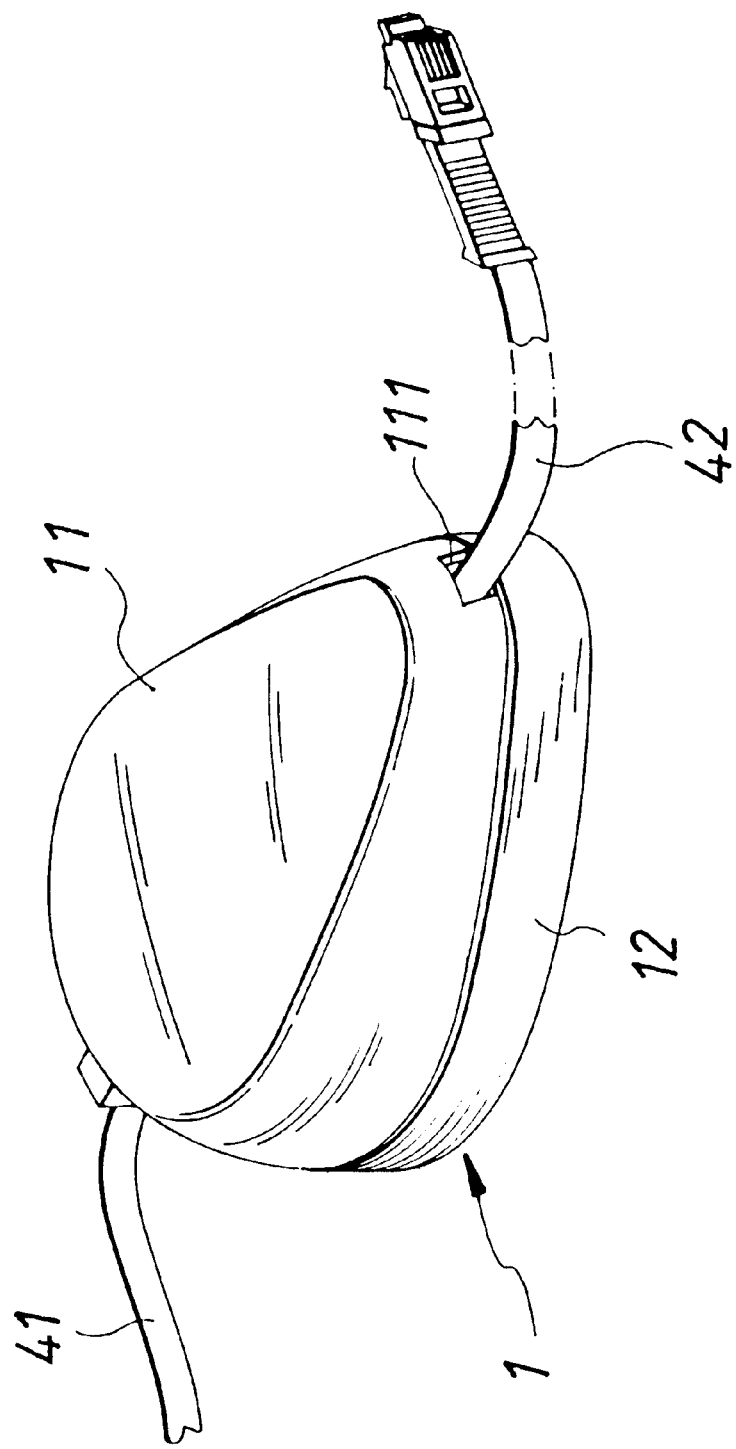
FIG. 1 is a perspective view of the present invention.

Enclosed along with the drawing of preferred embodiments, please find below a detailed description of the structural features, as well as the functions and objectives of the present invention.

Figure 2:
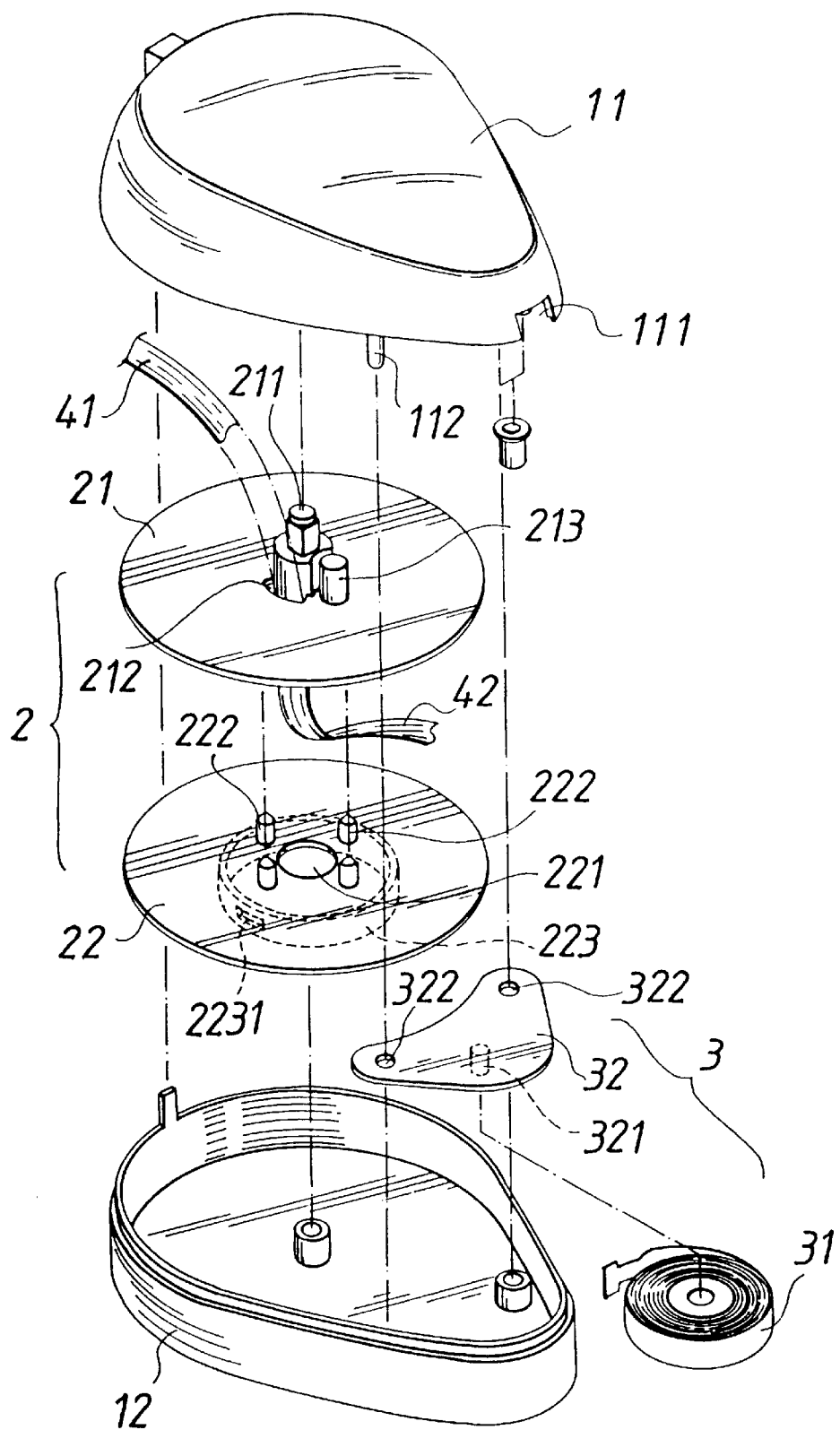
FIG. 2 is an exploded perspective view of the main component members of the present drawing.
Figure 3:
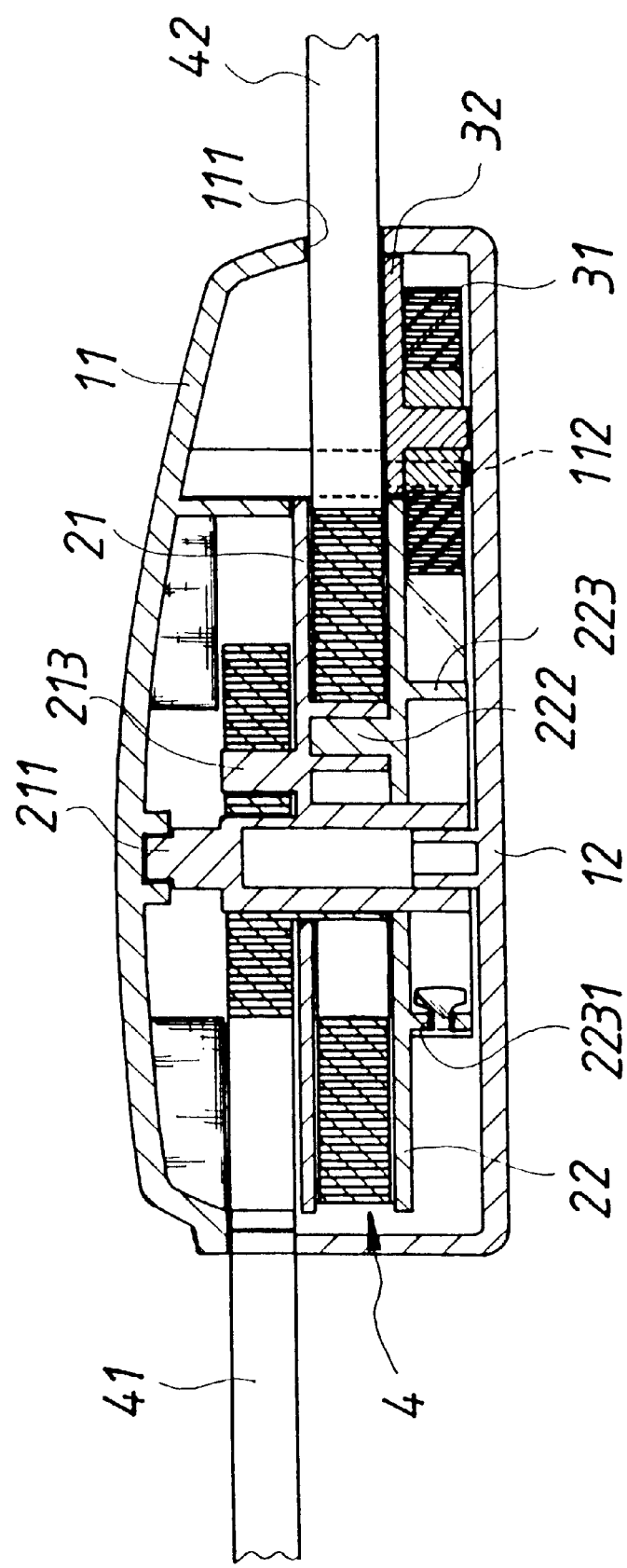
FIG. 3 is a cross-section view of the present invention.

As illustrated in FIGS. 1 to 3, the wire collector of the present invention comprises a shell body 1, in which a reel 2 and an elastic element 3 are located to enable communication wire 4 to have a moderate shrinkage force to collect the wire on reel 2 by way of the functioning of elastic element 3.

Shell body 1, is assembled by connecting an upper shell body 11 with a lower shell body 12. Front and rear sides of upper shell body 11, have slots 111 set separately, and upper shell body 11 has buckling columns 112 in its interior.

Reel 2 is formed by an upper reel body 21 and a lower reel body 22, with a central portion of the aforementioned upper reel body 21 having jack post 211 and passing hole 212 to enable jack post 211 to pass through and set on the upper and lower surfaces of upper reel body 21. A circular column 213 is set at the side of jack post 211 on the upper surface of upper reel body 21. Several buckling holes 213 and an annular wall 215 (please refer to FIG. 5) are located at the bottom surface of upper reel body 21. An axial hole 221 is formed in the central portion of lower reel body 22, and at the periphery of axial hole 221 a number of buckling columns 222 corresponding to buckling holes 214 are set. At the bottom surface of lower reel body 22, an annular rib 223 is located, having a long slot 2231 in the wall of annular rib 223 to enable jack post 211 of upper reel body 21 to pass through axial hole 221. Buckling columns 222 are joined with buckling holes 214 to form reel 2.

Elastic element 3, comprises a torsion spring 31 with one end connected with long slot 2231 and coiled on pivot axle 321 of fixing disc 32. Holes 322 located at the two ends of fixing disc 32 are mounted on buckling columns 1112 to achieve. a firm positioning effect.

Figure 4:
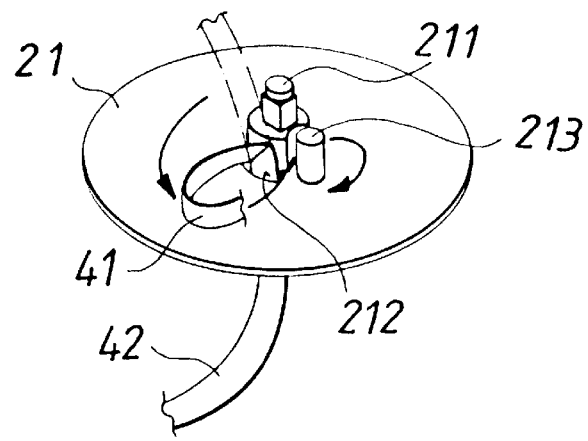
FIG. 4 is a schematic drawing showing a winding motion of the upper end wire of the present invention.
Figure 5:
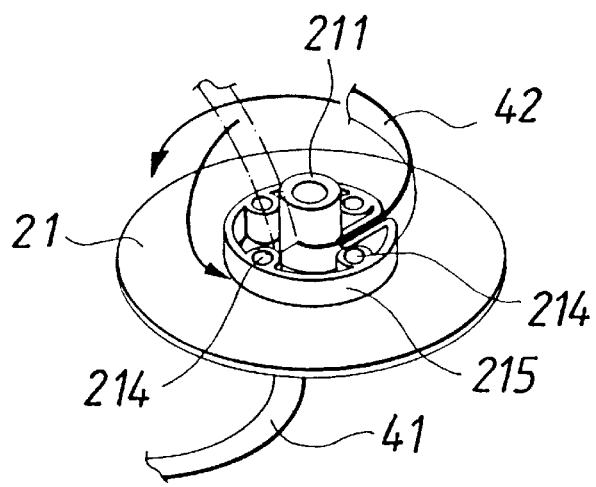
FIG. 5 is a schematic drawing showing a winding motion of the lower end wire of the present invention.
Figure 6:
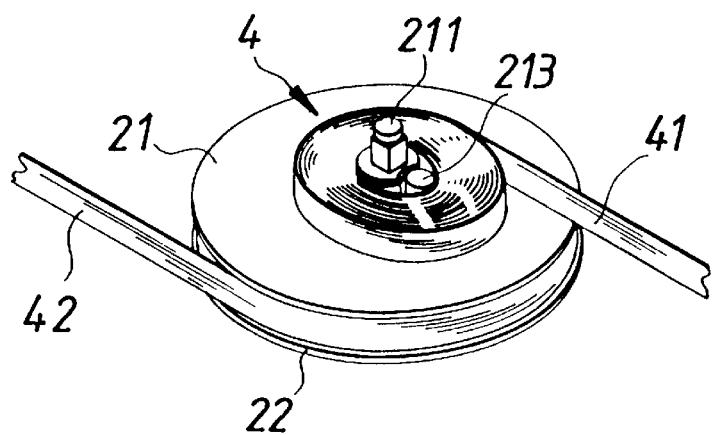
FIG. 6 is a perspective view showing the winding of the communication wire on the reel.

Communication wire 4, as illustrated in FIGS. 4 and 5, has its upper end 41 passing through hole 212 in upper reel body 21 and, after bending, it will pass between jack post 211 and circular column 213, and will further wind around the outer periphery of jack post 211 and circular column 213. Lower end 42 remains below upper reel body 21 and, after bending, is wound on annular wall 215 in an opposite direction as upper end 41 to activate the rotation of reel 2. The wire 4 will be placed on upper and lower sides of upper reel body 21 as illustrated in FIG. 6.

By utilizing the above-mentioned component members, reel 2 and communication wire 4 may become integrally formed by winding beforehand. Then, reel 2 and elastic element 3 are installed in shell body 1 to enable upper end 41 and lower end 42 of communication wire 4 to pass through front and rear slots 111, and to further enable lower end wire 42 to be pulled out easily from front slot 111 for utilization. When it is not in use, reel 2 will, by means of the shrinkage force of elastic element 3, activate a counter-direction rotation, so as to reel in lower end wire 42 which stretches out at the front end of shell body 1. This enables communication wire 4 to be collected in order by way of rolling the wire collector to make the operation easy and convenient.

Figure 7:
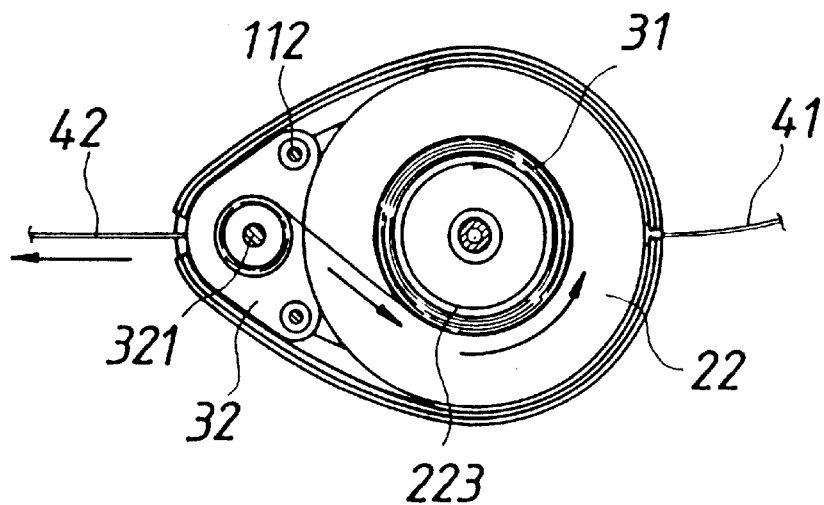
FIG. 7 is a plan view showing the torsion spring when the wire is being released.
Figure 8:
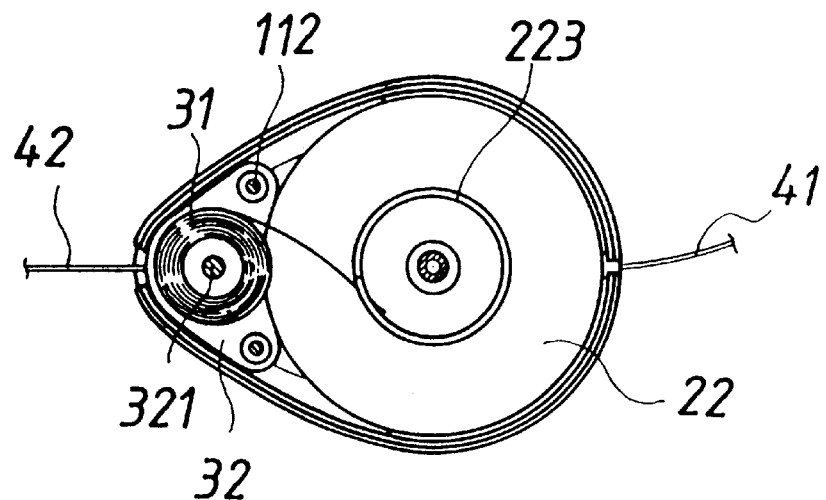
FIG. 8 is a plan view showing the torsion spring when the wire is being collected.

As indicated in FIGS. 7 and 8, when lower end wire 42 is being pulled out of shell body 1, wire reel 2 will rotate and thus further cause one end of torsion spring 31 to wind on the annular rib 223, and to produce a moderate shrinkage force. Due to the fact that one end of torsion spring 31 is pivotally set in a movable manner on pivot axis 321, the lower end wire 42 can, therefore, be pulled out easily and smoothly. When communication wire 4 is not in use, torsion spring 31 will apply its moderate shrinkage force by means of the positioning of pivot axis 321 to enable reel 2 to produce a counter-direction withdrawal, and to further enable lower end wire 42 to duly shrink back into reel 2 to assume its original position.

Figure 9:
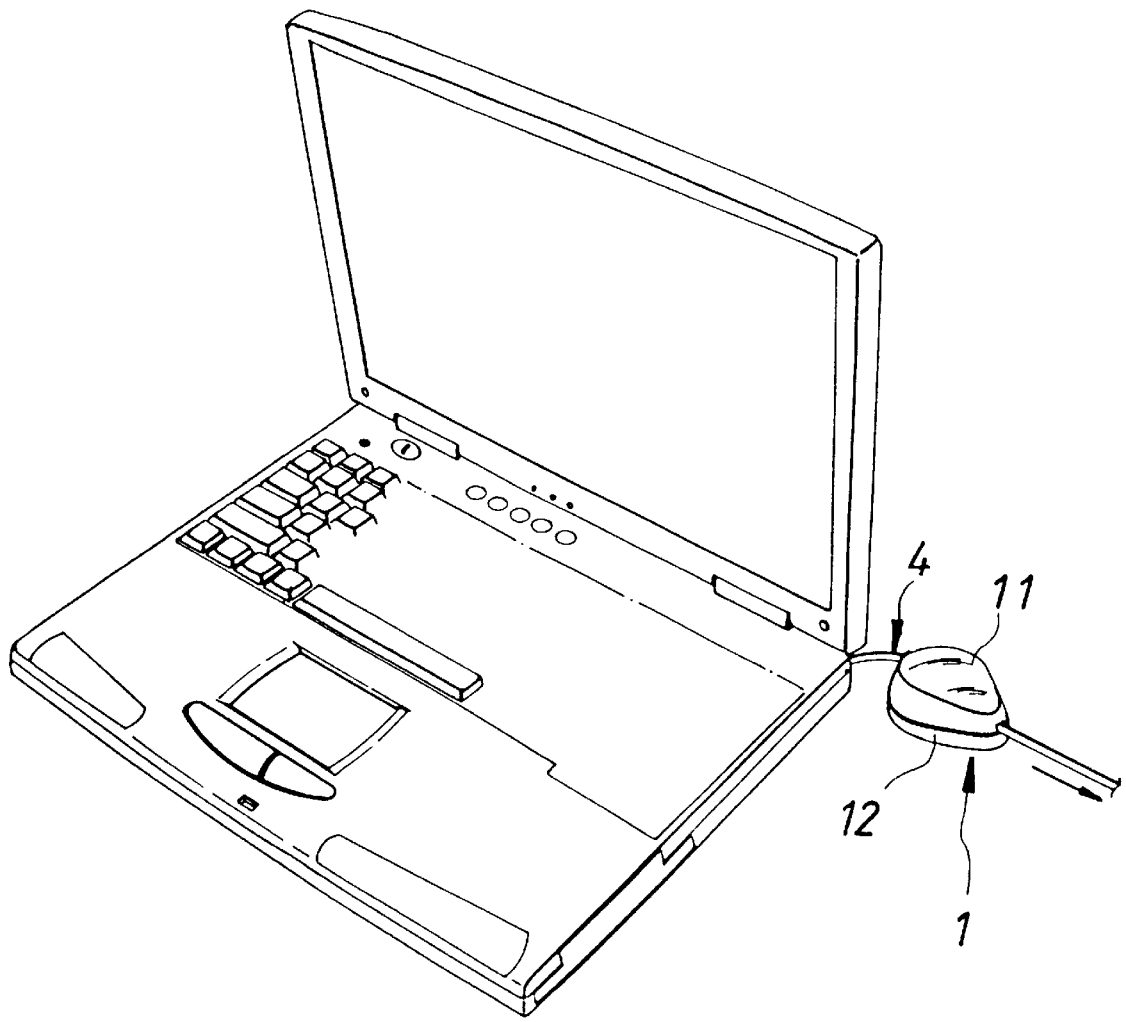
FIG. 9 is a perspective view showing the application of the present invention.

In this way, as indicated in FIG. 9, the wire collector can be used with a laptop computer. The wire will be collected in order without twisting, enabling rapid and convenient collecting of the wire for easy carrying.

Summarizing the above, it can be seen that the wire collector presented in the present invention is indeed precise and convenient for the extending and collecting of communication wire when applied to a laptop computer.

What is claimed is:

1. A wire collector comprising:

a) a shell including first and second shell bodies bounding an interior space, and having front and rear slots communicating with the interior space;

b) a reel rotatably mounted in the interior space and including first and second reel bodies attached together and a central jack post passing through the first and second reel bodies, the first reel body having a column extending therefrom adjacent to the central jack post so as to form a space between the column and central jack post, the second reel body having an annular rib extending therefrom with a long slot therethrough;

c) a communication wire including a first end portion passing through the first reel body, through the space between the central jack post and the column, wound around the central jack post and the column, and passing out of the shell through the rear slot, and a second end portion passing out of the shell through the front slot;

d) a fixing element mounted in the shell and having a pivot axle extending therefrom; and, e) a coiled torsion spring pivotally mounted on the pivot axle and having an end engaging the long slot in the annular wall to apply a retracting force to the reel when one of the ends of the communication wire is pulled out fo the shell the coiled torsion spring having a center which is not coaxial with the jack post.

* * * * *